United States Patent [19]

Tsutsumi et al.

[11] Patent Number: 5,414,336
[45] Date of Patent: May 9, 1995

[54] SERVO CONTROL APPARATUS WITH BACK-UP POWER SUPPLY

[75] Inventors: Seisuke Tsutsumi; Yasushi Ikawa; Akira Shima, all of Aichi, Japan

[73] Assignee: Mitsubishi Denki Kabushiki Kaisha, Tokyo, Japan

[21] Appl. No.: 141,053

[22] Filed: Oct. 26, 1993

[30] Foreign Application Priority Data

Oct. 27, 1992 [JP] Japan ................... 4-288702

[51] Int. Cl.6 ................................ G05B 11/01
[52] U.S. Cl. ................... 318/560; 318/565; 318/469; 318/140; 318/650
[58] Field of Search ............... 318/560, 565, 469, 140, 318/650

[56] References Cited

U.S. PATENT DOCUMENTS

| | | | |
|---|---|---|---|
| 4,268,783 | 5/1981 | Murray | 318/561 |
| 4,657,117 | 4/1987 | Lauer | 318/140 |
| 4,831,509 | 5/1989 | Jones et al. | 318/469 |

FOREIGN PATENT DOCUMENTS

| | | |
|---|---|---|
| 0148269 | 7/1985 | European Pat. Off. . |
| 3044658 | 6/1982 | Germany . |

Primary Examiner—William M. Shoop, Jr.
Assistant Examiner—Karen Masih
Attorney, Agent, or Firm—Sughrue, Mion, Zinn, Macpeak & Seas; Richard C. Turner; Peter A. McKenna

[57] ABSTRACT

A system for inverter control of a servo motor where in the inverter is connected to a velocity control section and a position detection section is connected to the servo motor. Primary and back-up power for operating the velocity control section and the position detection section is provided by power sources that are located in the velocity control section and are connected to the position detection section by cables. The cables used to provide signal transmission between the position detecting section and the velocity control section are switched by relays to transmit the power of a power failure back-up power supply at the time of a power failure. Also, a transmission signal transmitted from one of the position detecting section and the velocity control section to the other via a first cable connection is returned via a second cable connection and a connection fault may be judged depending on whether or not the return signal matches the transmission signal.

9 Claims, 5 Drawing Sheets

SERVO CONTROL APPARATUS WITH BACK-UP POWER SUPPLY

BACKGROUND OF THE INVENTION

1. Field of the Invention

The present invention relates to a servo control apparatus wherein a position detecting section having a function to detect the rotational position of a servo motor is disposed separately from a control section having a function to control the servo motor.

2. Description of the Background Art

FIG. 4 is a block diagram showing a servo control apparatus known in the art. In this drawing, a motor 1, e.g., a servo motor and a three phase alternating current supply 13 are connected to an inverter section 14 in a conventional arrangement. Operation of this arrangement is conducted in connection with a position detecting section 31 and a velocity control section 32, as subsequently explained.

Within position detecting section 31 is a position detector 2 that is connected to the servo motor 1 for detecting the motor rotational position. A position data generator 3 is for generating position data which indicates the absolute rotational position, e.g., absolute position, of the servo motor 1 based on the detection output of the position detector 2.

An alarm data generator 4 is for generating alarm data which indicates whether or not the position detector 2 and the position data generator 3 can operate without fault. A parallel-to-serial converter 5 is for converting parallel data into serial data and a switching circuit 6 is for switching between the position data output from the position data generator 3 and the alarm data output from the alarm data generator 4 as an input to the parallel-to-serial converter 5 on the basis of a switching signal.

A differential line driver 7 will receive the converter 5 output and transmit the conversion output as a differential signal to a differential line receiver 8 in the velocity control section 32. The output terminals of the differential line driver 7 and the input terminals of the differential line receiver 8 are connected by a pair of cables 38, 39.

A serial-to-parallel converter 9 converts the serial data output from the differential line receiver 8 into parallel data. A data processor 10 will generate several signals in response to the parallel data. First, processor 10 will produce a request code or comparable information on which the switching signal of the switching circuit 6 is based. Second, it will produce a control signal for controlling the servo motor 1 on the basis of an input command signal or a velocity command signal and the conversion output of the serial-to-parallel converter 9. The velocity command signal can be provided on signal line 11. Also, the processor will generate a position feedback signal on line 12 for transmission to the outside and a signal for transmission back to the position detecting section 31. Processor 10 also can provide a signal on line 15 to the inverter section 14 for controlling the conversion of the power output of the three-phase alternating current power supply 13 to a PWM-modulated three-phase alternating current power output.

A parallel-to-serial converter 17 is connected to receive an output from the processor that is destined for the position detecting section 31. The converter 17 is operative to convert a request code, or parallel data output from the data processor 10, into serial data. At 15 the output of the converter 17 is a differential line driver 18 for transmitting the conversion output of the parallel-to-serial converter 17 as a differential signal to a differential line receiver 19 in the position detecting section 31. The output terminals of the differential line driver 18 and the input terminals of the differential line receiver 19 are connected by a pair of cables 41, 42.

A request code decoder 20 is for decoding the receive output of the differential line receiver 19 and for outputting a switching signal for switching the switching circuit 6.

Three power supplies are seen in the above arrangement and two are located within the velocity control section 32. A first power supply 22 provides an output voltage on line 104 that is reduced at the time of a power failure. A second power supply 23 is used as a failure back-up power supply. A third power supply 26 is a primary supply for position detection section 31, which may provide a reduced voltage at the time of a power failure.

A diode 24 is located in position detection section 31 and its anode is connected with the positive pole of the power failure back-up power supply 23 in the velocity control section 32 via a cable 40. The cathode of diode 24 is connected with a power supply line 50 of the position detector 2 and position data generator 3. Another diode 25 has its anode connected with the positive pole of a power supply 26 and whose cathode is connected with the power supply line 50 of the position detector 2 and position data generator 3.

The diodes 24 and 25 cause either the power failure back-up power supply 23 or the power supply 26, whichever is higher in voltage at the time of an outage, to supply the power supply voltage to the power supply line 50 of the position detector 2 and position data generator 3.

Power supply 22 is connected by line 104 to a series of three resistors. A first resistor 27 has one end connected with a power supply line 104 and its other end connected with one of the input terminals of the differential line receiver 8 at cable 39. A second resistor 28 also has one end connected with the input terminal of the differential line receiver 8 at cable 39 and its other end connected with the other input terminal of the differential line receiver 8 at cable 38. A third a resistor 29 whose one end is connected with the input terminal of the differential line receiver 8 at cable 38 has its other end is grounded.

30 indicates an exclusive OR gate that is connected across resistor 28, with one input terminal connected with the input terminal of the differential line receiver 8 connected to cable 38 and its other input terminal connected with the input terminal of the differential line receiver 8 connected to cable 39. The "low" output from the exclusive OR gate 30 indicates that a fault, such as an open cable, has occurred at the cables 38, 39 which connect the differential line driver 7 and the differential line receiver 8.

As is clear from the above description and the illustration of FIG. 4, the position detecting section 31 comprises the position detector 2, the position data generator 3, the alarm data generator 4, the parallel-to-serial converter 5, the switching circuit 6, the differential line driver 7, the differential line receiver 19, the request code decoder 20, the diodes 24, and the diode 25. The power supply 26 serves as an auxiliary to the position detecting section 31.

Also, velocity control section 32 comprises the differential line receiver 8, the serial-to-parallel converter 9, the data processor 10, the parallel-to-serial converter 17, the differential line driver 18, the power supply 22, the power failure back-up power supply 23, the resistors 27, 28 and 29, and the exclusive OR gate 30.

34 indicates a cable for connecting a ground line 35 of the position detecting section 31 and a ground line 36 of the velocity control section 32.

The cables 34, 38 to 42 used to connect the position detecting section 31 and the velocity control section 32 are generally long so that the position detecting section 31 and the velocity control section 32 may be disposed apart from each other.

Operation will now be described. First, a sequence of operations wherein the servo motor 1 is controlled in accordance with the position data output by the position data generator 3 will be described with reference to a flowchart shown in FIG. 5.

At step S1, the data processor 10 generates the request code which commands the position detector 31 to transmit the position data to the serial-to-parallel converter 9. This request code is then output to the parallel-to-serial converter 17 and the procedure advances to step S2.

Meanwhile, the request code converted into serial data by the parallel-to-serial converter 17 is input to the request code decoder 20 via the differential line driver 18, the cables 41, 42, and the differential line receiver 19. Subsequently, the request code decoder 20 outputs the switching signal to the switching circuit 6 so that the position data output by the position data generator 3 is input to the parallel-to-serial converter 5.

Then, the position signal converted into serial data by the parallel-to-serial converter 5 is input to the serial-to-parallel converter 9 via the differential line driver 7, the cables 38, 39, and the differential line receiver 8. Subsequently, the position data converted into serial data is converted into a parallel position signal by the serial-to-parallel converter 9 and is output therefrom.

At step S2, the execution waits for a predetermined length of time required for the operation at step S1 between the generation and output of the request code by the data processor 10 to the parallel-to-serial converter 17 and the output of the position data from the serial-to-parallel converter 9, and the processing progresses to next step S3.

At step S3, the data processor 10 reads position data PF(n) output from the serial-to-parallel converter 9, and the execution proceeds to next step S4.

At step S4, since the data requested is the position data, the processing moves on to next step S5.

At step S5, it is determined whether position data PF(n) was read at step S3 for the first time or not. If it was not read for the first time, the execution advances to next step S6. If it was read for the first time, the execution progresses to step S7.

At step S6, the data processor 10 finds the speed of the servo motor 1 from PF(n) indicated by a difference between newly read PF(n) and previously read PF(n−1) and from a reading cycle or a difference between previous reading time of day and new reading time of day.

The control signal of the servo motor 1 is output on the basis of said speed and the input velocity command signal, and the execution advances to step S7.

It should be noted that in order to input the position feedback signal to a position control section (not shown) which receives the position command signal and outputs the velocity command signal, the data processor 10 performs a predetermined adjustment on position data PF(n) read from the serial-to-parallel converter 9 and outputs the position feedback signal to the signal line 12 at step S6.

A sequence of operation wherein the data processor 10 reads the alarm data output by the alarm data generator 4 will now be described.

In this case, at step S1 in FIG. 5, the request code generated by the data processor 10 commands the position detector 31 to transmit the alarm data to the serial-to-parallel converter 9.

Then, the switching command output by the request code decoder 20 switches the switching circuit 6 so that the alarm data output by the alarm data generator 4 is input to the parallel-to-serial converter 5.

Subsequently, the execution waits for the predetermined length of time at step S2, and the alarm data is read by the data processor 10 at step S3.

At step S4, since the data requested is the alarm data, the processing advances to step S7.

At step S7, it is determined whether the alarm data indicates that the position detector 2 and the position data generator 3 are in a normal condition or not. If the alarm data indicates the position detector 2 and the position data generator 3 are in a normal condition, the execution advances to step S9. If the alarm data indicates the position detector 2 or the position data generator 3 is in an abnormal condition, the execution advances to step S8.

At step S8, it is indicated that an abnormal condition occurred at the position detector 2 or the position data generator 3 and the execution comes to a stop.

When a power failure occurs, the output voltage of the primary power supply 26 reduces, but the power failure back-up power supply 23 assures that the necessary predetermined power supply voltage is provided to the power supply line 50 of the position detector 2 and position data generator 3 via line 40 and the diode 24. Accordingly, if a power failure occurs, the position data generator 3 operates without fault, and when the power is restored, the servo motor 1 can be positioned to where it had been immediately before the power failure.

It should be noted that the diode 25 prevents current from flowing back to the power supply 26 at the time of a power failure.

There are several reasons why the power failure back-up power supply 23 cannot be located in the position detecting section 31. First, the position detecting section 31 must be small in size because the position detecting section 31 must be arranged near the servo motor 1 and must be built into the small space inside of the mechanical unit with the servo motor 1. Second, the position detecting section 31 is usually located inside of the mechanical unit and cannot be easily accessed in a common operating environment. If the power failure back-up power supply 23 is located in the position detecting section 31, it becomes difficult to change the power failure back-up power supply 23. Third, the position detecting section 31 is usually located near the servo motor 1 where the atmosphere is very hot and does not provide a suitable environment for the power failure back-up power supply 23.

It should also be noted that the resistance values of the resistors 27, 28, 29 are selected such that the "low"

output is provided to the output terminals of the exclusive OR gate 30 if a fault, such as an open cable, occurs at the electrical connections between the output terminals of the differential line driver 7 and the input terminals of the differential line receiver 8. If this output is switched "low", the apparatus is designed to stop operation and generate alarm.

There also is a disadvantage in supplying the back-up power supply voltage to the position detecting section 31 from supply 22 via the cables from the power supply line 104 of the velocity control section 32, without using the power supply 26 of the position detecting section 31. The disadvantage accompanying such cost-saving measure may be described in accordance with FIG. 4.

When the position detecting section 31 and the velocity control section 32 are spaced away from each other, a voltage drop due to the cable for connecting the power supply 22 of the position detecting section 31 and the power supply of the velocity control section 32 and the cable 34 for connecting the ground line 35 of the position detecting section 31 and the ground line 36 of the velocity control section 32 increases. If there is a difference produced between the ground voltage level of the position detecting section 31 and the ground voltage level of the velocity control section 32, the "low" output may be provided from the exclusive OR gate 30 even if the electrical connections between the differential line driver 7 and the differential line receiver 8 are normal. Accordingly, cost reduction cannot be made by omitting the power supply 26.

The known servo control apparatus arranged as described above requires a cable that is exclusively used to connect the velocity control section and the position detecting section in order to back up the power supply at the time of a power failure, resulting in high costs.

Also, the known servo control apparatus requires the power supply to be provided for each of the velocity control section and the position detecting section in order to detect whether the connection fault of the cables employed for bidirectional signal transmission between the two sections exists or not without fault, resulting in high costs.

SUMMARY OF THE INVENTION

It is, accordingly, an object of the present invention to overcome the disadvantages in the background art by providing a servo control apparatus which does not require a dedicated cable provided for the connection of a control section and a position detecting section in order to back up a power supply at the time of a power failure.

It is another object of the present invention to provide a servo control apparatus which is provided with a power supply in one of a velocity control section and a position detecting section to supply power to the other via a cable connecting the two sections, and which detects whether the connection fault of cables used for bidirectional signal transmission exists or not without fault.

A servo control apparatus concerned with the present invention comprises a servo motor, a position detecting section having position detector for detecting the rotational position of the servo motor, a cable whose one end is electrically connected with the position detecting section, and a control section electrically connected with the other end of the cable and having a control unit for controlling the operation of the servo motor under the control of an input command signal and a signal based on the detection output of the position detector. The apparatus further comprises a switch means for switching between transmitting the power of a power failure back-up power supply held at a predetermined voltage at the time of a power failure and transmitting another signal via the cable between the control section and the position detecting section. Finally, it also has a power supply supervisor for supervising the voltage of a power supply reduced to less than the predetermined voltage at the time of a power failure and for causing the switch to perform a switching operation so that the power of the power failure back-up power supply is transmitted via the cable if the power supply voltage falls below the predetermined voltage.

Also, a servo control apparatus concerned with the present invention comprises a servo motor, a position detecting section having position detector for detecting the rotational position of the servo motor, a control section having control unit for controlling the operation of the servo motor under the control of an input command signal and a signal based on the detection output of the position detector. The system uses first cables for transmitting the signal based on the detection output of the position detector from the position detecting section to the control section, and second cables capable of transmitting a signal from the control section to the position detecting section. The apparatus further comprises return means for returning the other way a transmission signal transmitted from one of the control section and the position detecting section to the other via the first or second cables, and judging means for judging whether the connection fault of the first cables or the second cables exists or not depending on whether or not the returned signal matches the transmission signal.

In the servo control apparatus according to the present invention, when the power supply supervisor detects a power failure, switch-over is carried out by the switch during operation so that the power of the power failure back-up power supply is transmitted via the cable used for signal transmission between the control section and the position detecting section.

Also, in the servo control apparatus according to the present invention, the transmission signal sent from one of the control section and the position detecting section to the other via the first or second cables connecting the two sections is returned the other way, and the connection fault of the first or the second cable is determined depending on whether or not the return signal matches the transmission signal.

DESCRIPTION OF THE PREFERRED EMBODIMENTS

Figure 1:
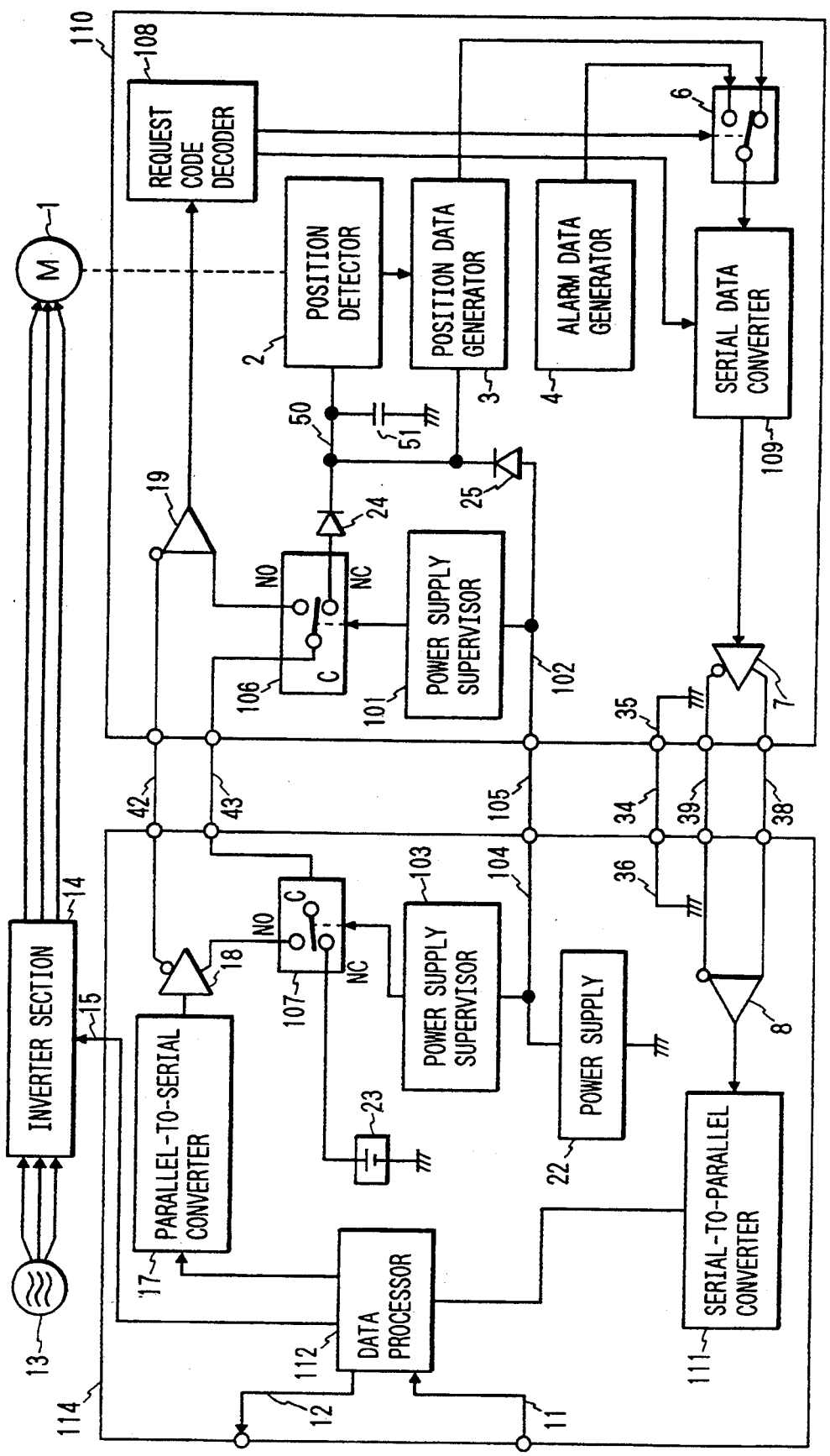
FIG. 1 is a block arrangement diagram of a servo control apparatus according to a preferred embodiment of the present invention.

A first embodiment of the present invention will now be described in accordance with the appended drawings. FIG. 1 is a block diagram showing the arrangement of a servo control apparatus according to the present invention.

Figure 4:
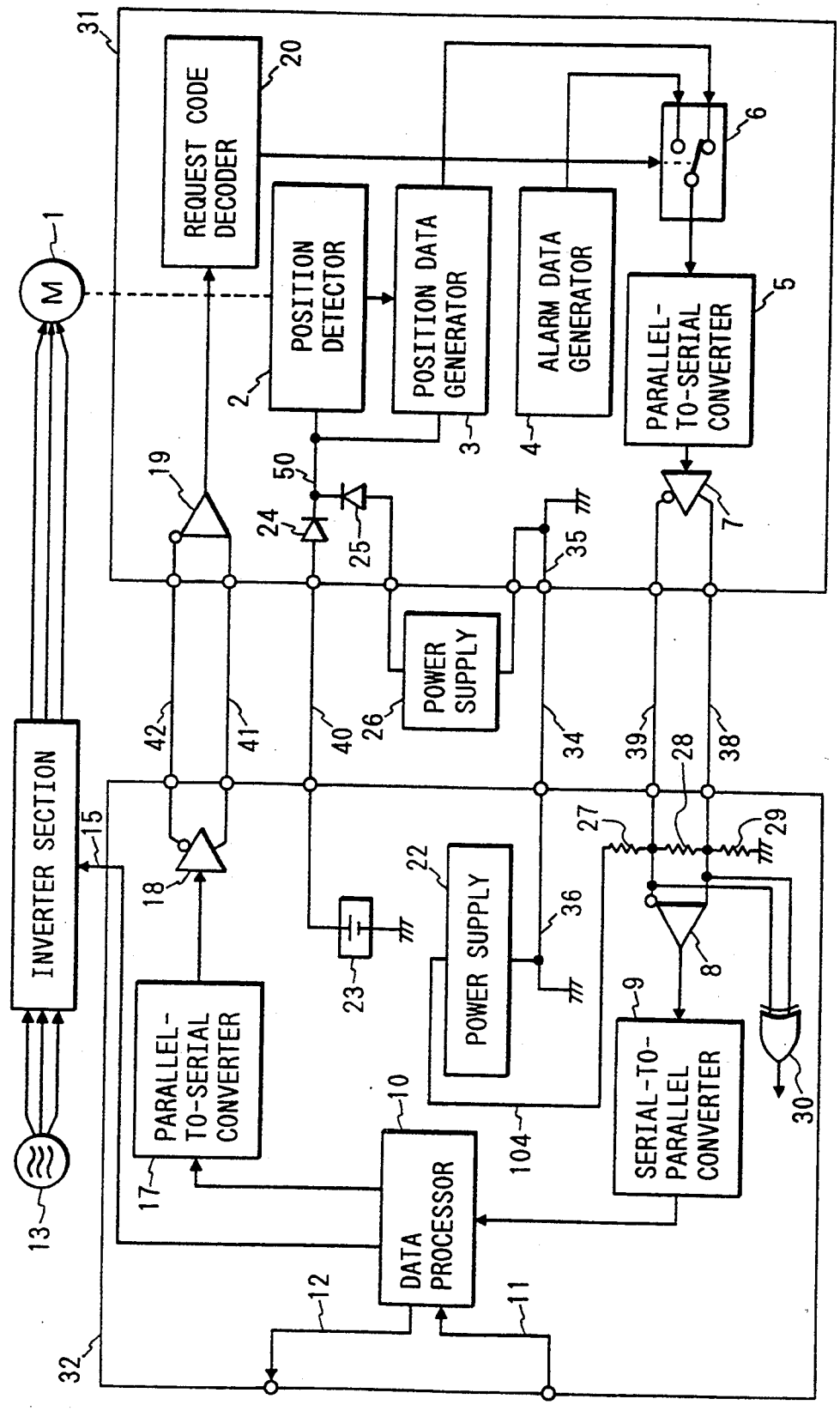
FIG. 4 is a block arrangement diagram illustrating a servo control apparatus known in the art.

Referring to this drawing, the numerals 1 to 4, 6 to 8, 11 to 15, 17 to 19, 22 to 25, 34 to 36, 38, 39, 42 and 104 designate parts identical to those in FIG. 4 which illustrates the conventional apparatus. The velocity control section is redesigned as section 114 connected to inverter section 14 and the position detecting section is redesigned as section 110 connected to motor 1.

A power supply supervisor 101 is used for supervising the voltage of a power supply line 102 and a power supply supervisor 103 is used for supervising the voltage of a power supply line 104. The two supervisors operate independently. A cable 105 is for connecting the power supply line 102 and the power supply line 104, and 106 and 107 designate relays.

Current to the exciting winding (not shown) of the relay 106 is shut off by the power supply supervisor 101 when the voltage of the power supply line 102 drops below a predetermined value. Also, current to the exciting winding (not shown) of the relay 107 is shut off by the power supply supervisor 103 when the voltage of the power supply line 104 falls below the predetermined value.

The common contact (C contact) of the relay 106 and the common contact (C contact) of the relay 107 are connected via a cable 43. Also, the normally closed contact (NC contact) of the relay 107 is connected with the positive pole of the power failure back-up power supply 23 and the normally open contact (NO contact) of the relay 107 is connected with one of the output terminals of the differential line driver 18.

The normally open contact (NO contact) of the relay 106 is connected with one of the input terminals of the differential line driver 19 and the normally closed contact (NC contact) of the relay 106 is connected with the cathode of the diode 24.

It should be noted that in FIG. 4 showing the conventional apparatus, the cable 40 connecting the positive pole of the power failure back-up power supply 23 and the diode 24 and the cable 41 connecting one of the output terminals of the differential line driver 18 and one of the input terminals of the differential line receiver 19 are not employed in FIG. 1. As described above, the cable 43 is provided to link the common contacts of the relays 106 and 107 in FIG. 1.

A request code decoder 108 and a serial data converter 109 are used in the position detecting section 110. It should be noted that the request code decoder 108 has an additional function to output a parallel request code to the serial data converter 109. Such function was not provided by the request code decoder 20 shown in FIG. 4, illustrating the conventional apparatus.

The serial data converter 109 generates a parallel signal by adding a parallel request code output by the request code decoder 108 to the switching output of the switching circuit 6. In addition, converter 109 converts this parallel signal into serial data for transmission via driver 7 and lines 38, 39 to the velocity control section 114.

Within velocity control section 114 is a serial-to-parallel converter 111 for converting the serial data received by the differential line receiver 8 over lines 38, 39 into parallel data.

It should be noted that since said serial-to-parallel converter 111 performs the serial-to-parallel conversion of the position data or alarm data including the additional request code, this converter 111 is arranged to be capable of converting into parallel data the serial data which has a greater data volume as compared to the serial-to-parallel converter 9 in FIG. 4 showing the conventional apparatus.

A data processor 112 is used in the velocity control section 114. Compared to the data processor 10 shown in the conventional design of FIG. 4, processor 112 includes an additional function to compare the request code output to the parallel-to-serial converter 17 with the request code output from the serial-to-parallel converter 111 and to judge the connection fault of the cables 38, 39, 42, 43.

The position detector 2, the position data generator 3, the alarm data generator 4, the switching circuit 6, the differential line driver 7, the differential line receiver 19, the diodes 24, 25, the power supply supervisor 101, the relay 106, the request code decoder 108, and the serial data converter 109 constitute the improved position detecting section 110. It should be noted that the power supply line 102 is provided in this position detecting section 110.

Also, the differential line receiver 8, the parallel-to-serial converter 17, the differential line driver 18, the power failure back-up power supply 23, the power supply supervisor 103, the relay 107, the serial-to-parallel converter 11, and the data processor 112 constitute an improved velocity control section 114. It should be noted that the power supply line 104 is provided in this velocity control section 114.

As a practical matter, the inverter section 14 and the velocity control section 114 constitute the motor control section.

With respect to the operation of the apparatus in identifying and overcoming a power outage problem, the functions of the power supply supervisors 101 and 103 are relevant to power failure detection. The request code decoder 108 and the serial data converter 109 function to provide a control return function. The data processor 112 acts to judge the presence of a problem condition and the data processor 112 and the inverter section 14 act to provide a control that solves the problem. In this regard, the relays 106 and 107 provide a necessary switching function and the cables 38 and 39 constitute first cables and the cables 42 and 43 constitute second cables that provide the necessary connections between the two primary sections.

Operation will now be described. When the velocity control section 14 is powered up and the voltage of the power supply lines 102 and 104 rises above a predetermined voltage, the power supply supervisors 101 and 103 apply current to the excitation windings of the relays 106 and 107. Subsequently, the common (C) contacts and normally open (NO) contacts of the relays 106 and 107 are connected, and one of the output terminals of the differential line driver 18 and one of the input terminals of the differential line receiver 19 are connected via the cable 43. In this case, the cable 43 is used for signal transmission.

When the voltage of the power supply lines 102 and 104 fall below the predetermined value due to a power failure, etc., the power supply supervisors 101 and 103 shut off the current to the excitation windings of the relays 106 and 107. Then, the common (C) contacts and normally closed (NC) contacts of the relays 106 and 107 are connected, and the voltage of the power failure back-up power supply 23 is supplied to the power supply line 50 of the position detector 2 and the position data generator 3 via the cable 43 and the diode 24.

Accordingly, in this case, the cable 43 is employed to transmit the power of the power failure back-up power supply 23 to the position detector 2 and position data generator 3.

When a power failure has occurred, the electric charge stored in the condenser 51 maintains the voltage of the power supply line 50 above the predetermined voltage until the switching actions of the relay 106 and relay 107, providing back-up power from battery 23, are finished.

It should be noted that while a signal need not be transmitted between the differential line driver 18 and the differential line receiver 19 at the occurrence of a power failure, the predetermined voltage must also be supplied to the power supply line 50 of the position detector 2 and the position data generator 3 during the power failure since, after the power is restored, as described above, the servo motor 1 is positioned to where it had been immediately before the power failure.

A sequence of operation wherein it is determined whether the connections between the output terminals of the differential line driver 7 and the differential line receiver 8 in FIG. 1 are faulty or not will now be described with reference to operation flowcharts shown in FIGS. 2 and 3.

Figure 2:
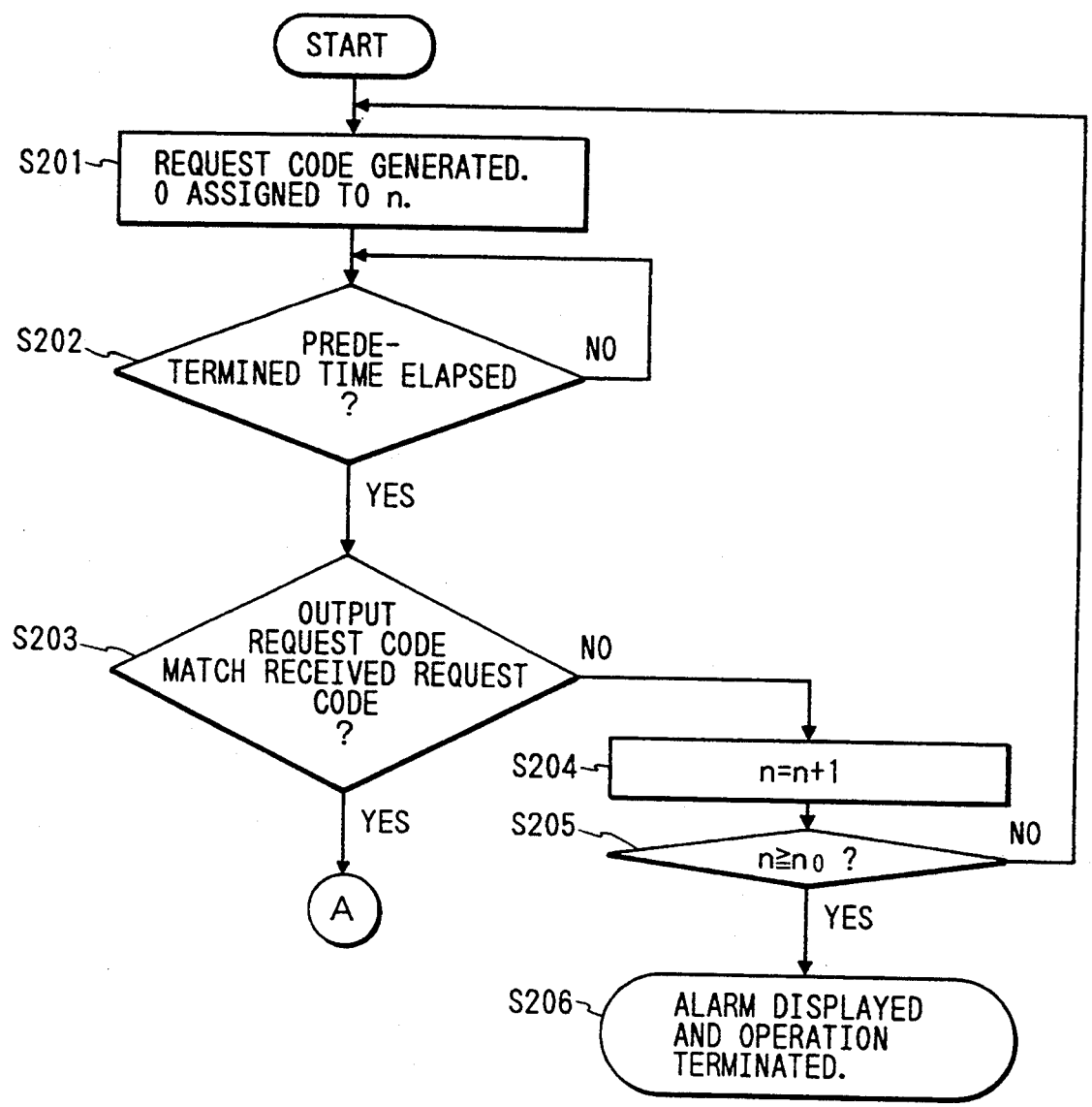
FIG. 2 is a flowchart illustrating the operation of the servo control apparatus according to the preferred embodiment of the present invention.
Figure 3:
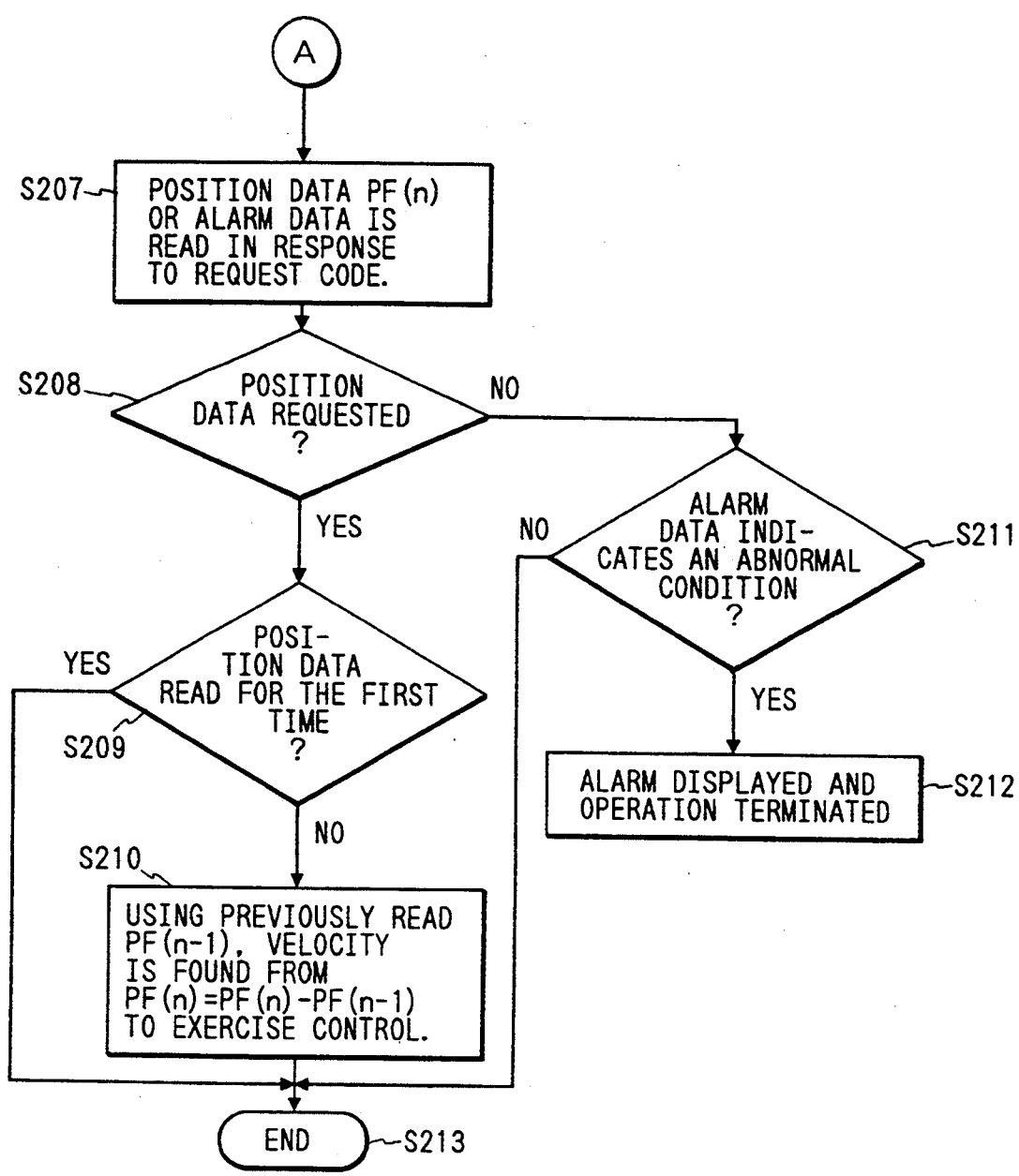
FIG. 3 is a flowchart illustrating the operation of the servo control apparatus according to the preferred embodiment of the present invention.

In FIGS. 2 and 3, at step S201, the data processor 112 generates a request code which commands the position detecting section 110 to transmit either of the position data and the alarm data to the serial data converter 109. This request code is then output to the parallel-to-serial converter 17. In addition, a variable n that is related to the number of iterations performed by the processor 112 will be assigned a value of 0. Thereafter, the processing progresses to step S202.

In the meantime, the request code converted into serial data by the parallel-to-serial converter 17 is input to the request code decoder 108 via the differential line driver 18, the C-NO connection established by relays 106, 107, the cables 42, 43, and the differential line receiver 19.

If the request code decoded is the one which commands the position data to be transmitted, the request code decoder 108 outputs the switching signal to the switching circuit 6 so that the position data output from the position data generator 3 is input to the serial data converter 109.

Alternatively, if the request code decoded is the one which commands the alarm data to be transmitted, the request code decoder 108 outputs the switching signal to the switching circuit 6 so that the alarm data output from the alarm data generator 4 is input to the serial data converter 109.

Also, the request code output from the request code decoder 108 in the form of a parallel signal is input to the serial data converter 109.

The serial data converter 109 adds the request code output from the request code decoder 108 in the form of the parallel signal to the position data or alarm data output from the switching circuit 6 in the form of the parallel signal, further converts the result of addition into serial data, and outputs the serial data to the differential line driver 7.

This serial signal is input to the serial-to-parallel converter 111 via the differential line driver 7, the cables 38, 39, and the differential line receiver 8. The serial signal is then reconverted to a parallel signal by the serial-to-parallel converter 111 and the parallel signal is output to the data processor 112.

At step S202, the execution waits for a period of time required for the operation performed at step S201 between the output of the request code by the data processor 112 and the output of the position data or alarm data having the additional request code from the serial-to-parallel converter 111, and the processing advances to next step S203.

At step S203, the data processor 112 reads the request code in the conversion output of the serial-to-parallel converter 111 and compares this read request code with the request code output by the data processor 112 at step S201. If they match, the execution advances to step S207. If they do not match, the processing progresses to step S204.

At step S204, variable n is incremented by 1 and the operation moves to step S205.

At step S205, it is determined whether or not variable n is smaller than preset constant n0. If it is smaller, the execution returns to step S201 for a further iteration. If it is not smaller, the processing advances to step S206.

Namely, steps S201 to S203 are executed up to n0 times until a match is determined at step S203. If a match is not determined within the prescribed number of iterations, the execution progresses to step S206.

Figure 5:
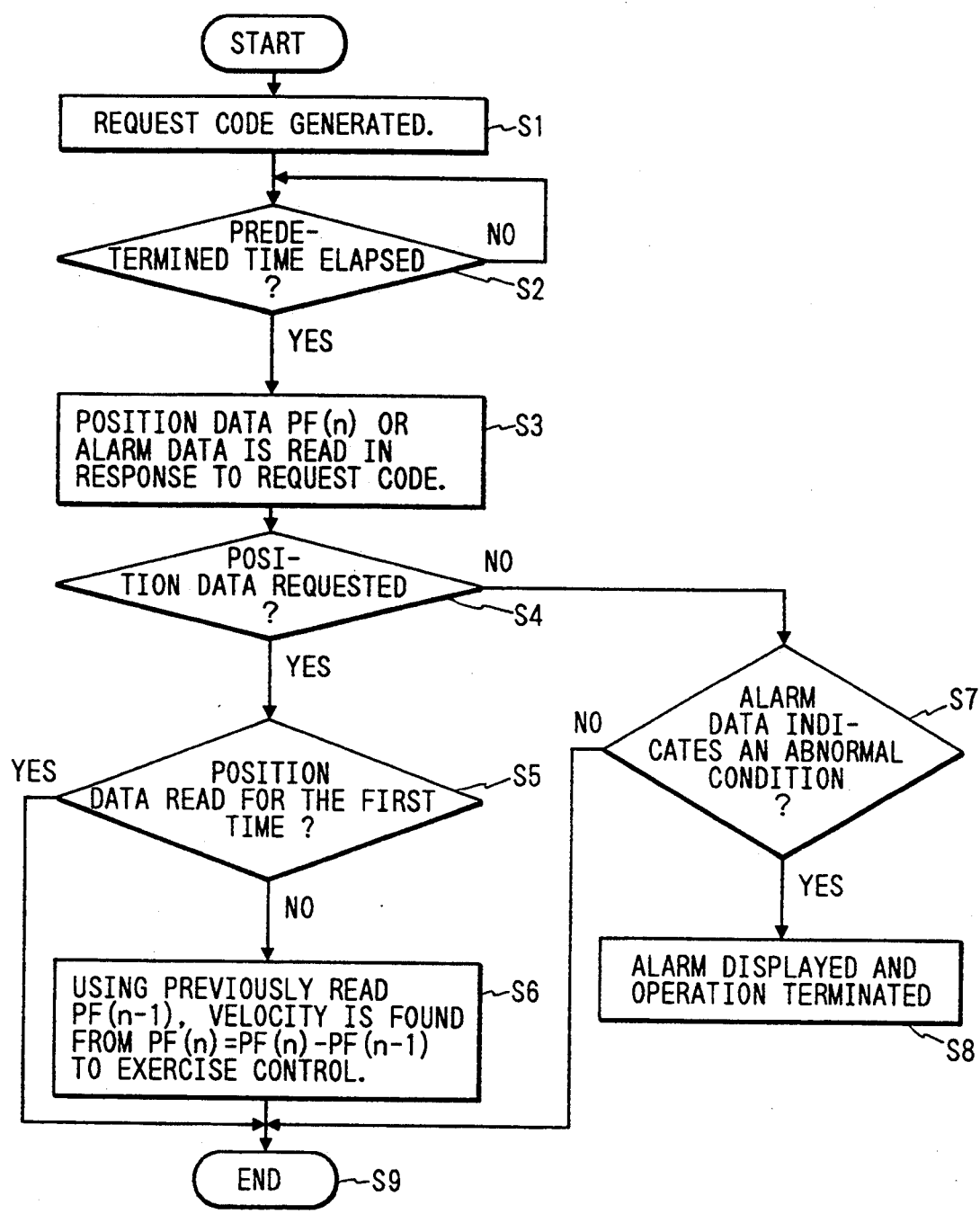
FIG. 5 is a flowchart illustrating the operation of the servo control apparatus known in the art.

At step S206, it is indicated that a receive signal transmitted from the position detecting section 110 is faulty due to a connection fault, etc., between the output terminals of the differential line driver 7 and the differential line receiver 8, and the execution comes to a stop. The operations at steps S207 to S213 are identical to those at steps S3 to S9 in FIG. 5 showing the process of the conventional design.

It will be apparent that the invention, as described above, achieves a servo control apparatus which does not require a cable exclusively used to connect the control section and the position detecting section in order to back up the power supply at the time of a power failure, whereby ,5 the whole apparatus is reduced in weight and cost. When the power failure detecting means detects a power failure, switch-over is carried out by the switching means during operation so that the power of the power failure back-up power supply is transmitted via the cable used for signal transmission between the control section and the position detecting section.

It will also be apparent that the invention achieves a servo control apparatus which is provided with a power supply in one of the control section and the position detecting section to supply power to the other via the cable connecting the two sections, and which detects whether the connection fault of the cables used for bidirectional signal transmission exists or not without fault. The transmission signal sent from one of the control section and the position detecting section to the other via the first or second cables connecting the two sections is returned the other way, and the connection fault of the first or the second cables is determined depending on whether or not the return signal matches the transmission signal.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A servo control apparatus comprising a motor, a position detecting section having position detecting means for detecting the rotational position of said motor and generating a position output, a control section having control means for controlling the operation of said motor in response to an input command signal and a signal based on the output of said position detecting means, a primary power supply, a first cable having first and second ends and defining a data transmission path, said first end being electrically connected with said position detecting section and said second end being electrically connected with said control section, and a power failure back-up power supply provided in one of said position detecting section and said control section and being operative to maintain a predetermined voltage at the time of a power failure, further comprising:

power failure detecting means for detecting a power failure; and switching means for switching between transmitting a data signal at the time of normal power condition via said data transmission path and transmitting the power of said power failure back-up power supply at the time of a power failure via said data transmission path on the basis of the detecting output of said power failure detecting means.

2. The servo control apparatus as set forth in claim 1, wherein said power failure detecting means comprises power level detector means disposed at each of said control section and said position detecting section for detecting power levels at said corresponding section.

3. The servo control apparatus as set forth in claim 1, further comprising temporary power supply means for providing power temporarily before operation of said switching means.

4. The servo control apparatus as set forth in claim 2, wherein said level detectors operate independently.

5. The servo control apparatus as set forth in claim 1, further comprising a dedicated power path for providing primary power from said primary power supply in one of said position detecting section and said control section to the other of said sections.

6. A servo control apparatus comprising a motor, a position detecting section having position detecting means for detecting the rotational position of said motor, a control section having control means for controlling the operation of said motor under the control of an input command signal and a signal based on the detection output of said position detecting means, first cable means for transmitting said signal based on the detection output of said position detecting means from said position detecting section to said control section, and second cable means for transmitting a signal from said control section to said position detecting section, further comprising:

return means for retransmitting a transmission signal, transmitted from one of said control section and said position detecting section to the other via one of said first or second cables to the other section via the other cable; and a data processor for judging whether a connection fault exists in one of said first or said second cables, depending on whether or not a retransmitted signal matches said transmission signal.

7. The servo control apparatus as set forth in claim 6, further comprising means for generating a request code, and means for transmitting said request code via said second cable means.

8. The servo control apparatus as set forth in claim 7, further comprising means for decoding said request code and generating a corresponding output code.

9. The servo control apparatus as set forth in claim 8, further comprising means for returning said output code via said first cable means to said data processor.

* * * * *